3,466,175
SEASONING COMPOSITIONS CONTAINING TRI-
CHOLOMIC ACID AND IBOTENIC ACID AS
FLAVOR ENHANCERS
Tsunematsu Takemoto, Sendai, Japan, assignor to Takeda
Chemical Industries, Ltd., Osaka, Japan
No Drawing. Filed Dec. 14, 1965, Ser. No. 513,851
Claims priority, application Japan, Dec. 17, 1964,
39/71,389
Int. Cl. A23l 1/22
U.S. Cl. 99—140                              7 Claims

ABSTRACT OF THE DISCLOSURE

Tricholomic acid and ibotenic acid enhance the flavor and quality of food and produce a synergistic effect with respect to flavor when combined with a 5′-nucleotide.

---

This invention relates to a novel seasoning composition, a process for preparing the same and a method for improving or enhancing flavor or taste of foods.

As chemical condiments, monosodium glutamate has long been known and sodium succinate and 5′-nucleotides such as 5′-inosinic acid, 5′-guanylic acid, and 5′-xanthylic acid have come to be employed in recent years. These chemical condiments have their respective specificity in taste.

The present invention adds further chemical condiments in the form of tricholomic acid or ibotenic acid which also have an action to improve or enhance the flavor or taste of foods.

Tricholomic acid and ibotenic acid are represented by the following formulas:

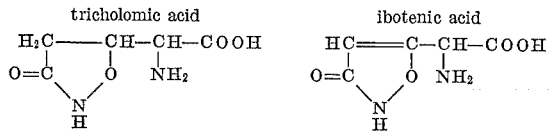

and are respectively isolated from *Tricholoma muscarium* Kawamura and *Amanita strobiliformis* (Paul.) Quel. These compounds were named as such by the present inventor and one of his co-workers and their chemical structures were also determined by them (the Journal of the Pharmaceutical Society of Japan 84, 1183, 1186, 1231, 1233).

The present invention is based on the observation that there is a significant synergy between tricholomic acid or ibotenic acid and 5′-nucleotide, and that tricholomic acid or ibotenic acid has various effects such as suppressing an unpleasant odor caused by protein hydrolyzate, etc. preventing deliquescence of monosodium glutamate, 5′-nucleotide, succinic acid, sodium chloride, etc., and keeping appearance of foods fresh.

It is an object of this invention to provide a novel chemical condiment. Further object of this invention is to provide a novel utility for tricholomic acid and ibotenic acid.

Tricholomic acid and ibotenic acid have respectively a mild, subtle, delicate taste and a good body, and the taste is a lingering one, i.e., persists for a long time. Further, the threshold values of these compounds are far lower (about ⅒) than that of monosodium glutamate.

Tricholomic acid and ibotenic acid can be obtained by extracting *Tricholoma muscarium* Kawamura and *Amanita strobiliformis* (Paul.) Quel. respectively (see the Journal of the Pharmaceutical Society of Japan 84, 1184, 1185, 1187, 1188). Alternatively, tricholomic acid can be produced chemically by reacting diethyl (or dimethyl)-3-chloroglutamate which is produced from diethyl (or dimethyl)-3-hydroxyglutamate by halogenation, with hydroxylamine (Chemical & Pharmaceutical Bulletin 13, No. 6, 753–758).

For the purpose of this invention, tricholomic acid and ibotenic acid can be employed in the free form or as a nontoxic alkaline salt such as alkali metal salt, e.g., sodium salt, potassium salt; alkaline earth metal salt., e.g., calcium salt; amine salt; etc.

These acids increase in their stability toward heat by being converted into the said alkaline salt form.

In the present invention, tricholomic acid and ibotenic acid, e.g. crude extract of *Tricholoma muscarium* Kawamura or *Amanita strobiliformis* (Paul.) Quel. can be employed as they are, so long as they do not contain any impurity which has an unpleasant odor or taste or which is otherwise harmful, or they may be purified, if desired.

The threshold values of tricholomic acid and ibotenic acid are estimated to be about 0.003% which is far lower than that of monosodium glutamate, 0.02%. Further, as mentioned hereinbefore, when tricholomic acid or ibotenic acid is employed in combination with 5′-nucleotide, a remarkable synergy is observed between the tricholomic acid or ibotenic acid and the 5′-nucleotide. Therefore, tricholomic acid or ibotenic acid used in this way is effective in an amount below its threshold value, and the seasoning effect is perceptible at the level of about one-tenth of the threshold value. As the 5′-nucleotide, there may be used 5′-adenylic acid, adenosine-5′-diphosphate, adenosine-5′-triphosphate, 5′-uridylic acid, 5′-cytidylic acid, 5′-guanylic acid, 5′-inosinic acid, 5′-deoxyinosinic acid, 5′-deoxyguanylic acid and their nontoxic salts. According to the present invention, there is a significant synergy between tricholomic acid or ibotenic acid and 5′-adenylic acid, 5′-uridylic acid or 5′-cytidylic acid which per se have no flavorous taste, while no synergy is observed between 3′- or 2′-nucleotides and tricholomic acid or ibotenic acid.

Tricholomic acid or ibotenic acid may be added to foods in solid state or in a liquid state dissolved in water or hydrophilic palatable and edible organic solvent, e.g., alcohol. In imporving the taste of foods, the objective foods are mixed with tricholomic acid or ibotenic acid, or are impregnated with a solution of tricholomic acid or ibotenic acid, or sprinkled over with the solution. The addition of tricholomic acid or ibotenic acid is carried out during or after the preparation of the foods.

Foods to be seasoned with tricholomic acid or ibotenic acid include fermented foods such as bean paste (miso), soy sauce, vinegar, sake, etc., paste such as ham, sausage, steamed fish paste (Kamaboko or chikuwa), etc., meats such as whale meat, poultry meat, pork, beef, etc., milk and its processed products thereof such as cow's milk, condensed milk, cheese, etc., noodles made of cereals such as macaroni, etc.

In most cases, it is preferable to employ tricholomic acid or ibotenic acid together with 5′-nucleotide and if desired, other chemical condiment such as monosodium glutamate, or sodium chloride. The ratio of tricholomic acid or ibotenic acid relative to 5′-nucleotide is ¹⁄₁₀₀ to 100, preferably about ⅒ to 10 by weight. In case of employing tricholomic acid or ibotenic acid together with 5′-nucleotide and monosodium glutamate, the ratio of monosodium glutamate relative to the mixture of tricholomic acid or ibotenic acid and 5′-nucleotide in the above-mentioned ratio, is preferably about ⅒ to 10, by weight. The preparation of the composition containing tricholomic acid or ibotenic acid and 5′-nucleotide is carried out by simply mixing, or by preparing a nucleus of either tricholomic acid or ibotenic acid or 5′-nucleotide and successively causing other components to adhere to the nucleus. If desired, a composition of tricholomic acid or ibotenic acid and 5′-nucleotide, irrespective of whether it is of powdery form or granule, can be coated with a known coating agent. As the coating agent there can be used aliphatic acid esters of sugars, e.g., L-ascorbic acid 6-oleate, agar-agar, gelatin, casein, acetal resin, polyvinylacetate resin, waxes, stearic acid, vegetable proteins, etc. The coating of the composition of tricholomic acid or ibotenic acid and 5'-nucleotide is carried out by dissolving the said coating agent in water, or organic solvent such as alcohol, chloroform, carbon tetrachloride, etc., and spraying the solution on the surface of the mixture; or by impregnating the composition with the coating agent.

In addition to the action of enhancing the taste of foods, tricholomic acid and ibotenic acid have an effect of improving the quality of foods. More specifically, depending on the kind, property of state of food, tricholomic acid and ibotenic acid can prevent deterioration of food and separation of water therefrom, and keep the freshness and vivid appearance thereof; for example, when either of them is added to food paste, it improves color and increases viscosity and elasticity; when added to sake (rice wine), it prevents deterioration, when added to miso (bean paste) or soy sauce, it increases stability; and when added to milk or its processed matter, it lowers curd tension and promotes digestion.

The most effective amount of tricholomic acid or ibotenic acid to be employed varies with kind of food, stage of food, etc., but generally, about 0.1 to 0.005% by weight relative to the food is preferable.

Experiment 1

Threshold values of tricholomic acid and ibotenic acid are measured by 40 panels (20 men; 20 women). The following table shows rate of persons who can distinguish sample (an aqueous solution of tricholomic acid or ibotenic acid) from control (water).

TABLE 1

| | Rate of persons who can distinguish sample from control | | | | | |
|---|---|---|---|---|---|---|
| Concentration, percent | 0.05 | 0.025 | 0.0125 | 0.00625 | 0.00312 | 0.00156 |
| Tricholomic acid | 100 | 100 | 100 | 87.5 | 62.5 | 25 |
| Ibotenic acid | 100 | 100 | 100 | 100 | 52.5 | 25 |

The results show that the threshold values of tricholomic acid and ibotenic acid are around 0.003%.

Experiment 2

Table 2 shows the rate of persons who can distinguish sample solution from control.
Panel: 40 persons.
Sample solution is prepared by adding ibotenic acid to an aqueous solution of 0.01% of disodium 5'-inosinate and 0.8% of sodium chloride.
Control is the same aqueous solution but containing no ibotenic acid.

TABLE 2

| Amount of ibotenic acid, percent: | Rate of persons who distinguish sample from control (percent) |
|---|---|
| 0.0015 | 100 |
| 0.003 | 85 |
| 0.00006 | 50 |

Experiment 3

Table 3 shows the rate of persons who can distinguish the sample solution from control.
Panel: 40 persons.
Sample solution is prepared by adding tricholomic acid to an aqueous solution of 0.003% of disodium 5'-guanylate and 0.8% of sodium chloride.
Control is the same aqueous solution as the sample solution but containing no tricholomic acid.

TABLE 3

| Amount of tricholomic acid, percent: | Rate (percent) |
|---|---|
| 0.0015 | 100 |
| 0.0003 | 87.5 |
| 0.00006 | 57.5 |

Experiment 4

Test method: pair test.
Panel: 20 persons.
Result:

TABLE 4

| Sample | Number of persons who perceive sample (1) more flavorous than sample (2) | |
|---|---|---|
| (1) ibotenic acid 0.0015%+AMP 0.0075%<br>(2) Ibotenic acid 0.003% | 18 | *** |
| (1) Ibotenic acid 0.0015%+ADP 0.015%<br>(2) Ibotenic acid 0.003% | 18 | *** |
| (1) Ibotenic acid 0.0015%+ATP 0.015%<br>(2) Ibotenic acid 0.003% | 18 | *** |
| (1) Tricholomic acid 0.00075%+AMP 0.0075%<br>(2) Tricholomic acid 0.0015% | 16 | ** |
| (1) Tricholomic acid 0.00075%+ADP 0.015%<br>(2) Tricholomic acid 0.0015% | 18 | *** |
| (1) Tricholomic acid 0.00075%+ATP 0.015%<br>(2) Tricholomic acid 0.0015% | 16 | ** |

AMP=5'-adenylic acid; ADP=adenosine-5'-diphosphate.
APT=adenosine-5'-triphosphate.
** Significant at 1% level.
*** Significant at 0.1% level.

Experiment 5

Test method: pair test.
Panel: 20 persons.
Result:

TABLE 5

| Sample | Number of persons who perceive sample (1) more flavorous than sample (2) | |
|---|---|---|
| (1) Ibotenic acid 0.0015%+UMP 0.5%<br>(2) Ibotenci acid 0.003% | 20 | *** |
| (1) Ibotenic acid 0.0015%+CMP 0.5%<br>(2) Ibotenic acid 0.003% | 18 | *** |
| (1) Ibotenic acid 0.0015%+UMP 0.5%<br>(2) UMP 1% | 16 | ** |
| (1) Ibotenic acid 0.0015%+CMP 0.5%<br>(2) CMP 1% | 16 | ** |
| (1) Tricholomic acid 0.00075%+UMP 0.5%<br>(2) Tricholomic acid 0.0015% | 18 | *** |
| (1) Tricholomic acid 0.00075%+CMP 0.5%<br>(2) Tricholomic acid 0.0015% | 18 | *** |
| (1) Tricholomic acid 0.00075%+UMP 0.5%<br>(2) UMP 1% | 18 | *** |
| (1) Tricholomic acid 0.00075%+CMP 0.5%<br>(2) CMP 1% | 16 | ** |

UMP=5'uridylic acid; CMP=5'-cytidylic acid.
** Significant at 1% level.
*** Significant at 0.1% level.

Hereinafter, the marks * and  have the same respective meanings as above unless otherwise indicated.

Results such as those of Experiments 2, 3, 4 and 5 establish that there is a significant synergistic action in taste between ibotenic acid or tricholomic acid and 5'-nucleotide.

Experiment 6

Test method: pair test.
Panel: 30 persons (15 men; 15 women).
Sample: vegetable soup containing 0.05% of sodium tricholomate.
Control: the same soup containing no sodium trichlomate.
Result:

Number of persons who prefer sample to control ___ [1] 28
Number of persons who prefer control to sample ___ 2

[1] See footnote under Table 4.

Experiment 7

Test method: Triangle difference test, triangle preference test.
Panel: 40 persons.
Sample: solution prepared by adding 0.05% of ibotenic acid to miso.
Control: the same solution containing no ibotenic acid.
Result:
(A) Triangle difference test:

Number of persons who correctly sensed _____ [1] 37
Number of persons who did not correctly sense ____ 3

[1] See footnote under Table 4.

(B) Triangle preference test:

Number of persons who prefer sample to control ___ [1] 35
Number of persons who prefer control to sample ___ 2

[1] See footnote under Table 4.

Experiment 8

Test method: pair test.
Panel: 40 persons.
Sample is prepared by adding 0.004% of tricholomic acid to sake.
Control is the same sake containing no tricholomic acid.
Result:

Number of persons who prefer sample to control ___ [1] 31
[1] See footnote under Table 4.
Number of persons who prefer control to sample ____ 9

[1] See footnote under Table 4.

Experiment 9

Test method: pair test.
Panel: 24 persons.
Sample: vegetable soup containing 0.05 gram of tricholomic acid and 0.2 gram of disodium 5'-insoinate per liter.
Control: vegetable soup containing 0.2 gram of of disodium 5'-inosinate per liter.
Result:

Number of persons who prefer sample to control ___ [1] 23
Number of persons who prefer control to sample ____ 1

[1] See footnote under Table 4.

Experiment 10

Test method: pair test.
Panel: 24 persons.
Sample: sauce containing 0.1 gram of disodium 5'-guanylate and 0.05 gram of ibotenic acid per liter.
Control: sauce containing 0.1 gram of disodium 5'-guanylate per liter.
Result:

Number of persons who prefer sample to control ___ [1] 21
Number of persons who prefer control to sample ___ 3

[1] See footnote under Table 4.

Experiment 11

Test method: pair test.
Panel: 30 persons.
Sample: miso soup containing 0.03% of ibotenic acid, 0.2% of disodium 5'-guanylate and 0.2% of disodium cytidylate.
Control: miso soup containing 0.2% of disodium 5'-guanylate and 0.2% of disodium 5'-cytidylate.
Result:

Number of persons who prefer sample to control ___ [1] 22
Number of persons who prefer control to sample ___ 8

[1] = Significant at 5% level.

Presently preferred illustrative embodiments of the invention are set forth as follows:

*Example 1.*—0.1 gram of tricholomic acid is added to one liter of vegetable soup containing table salt, to give enhancedly flavorous vegetable soup.

*Example 2.*—0.05 gram of sodium ibotenate is added to one liter of sake to give enhancedly tasty sake.

*Example 3.*—Raw soy sauce, prepared by the per se conventional method, is sterilized. To this treated soy sauce are added 0.2 gram of tricholomic acid, 0.3 gram of sodium 5'-inosinate and 0.4 gram of sodium 5'-guanylate per liter to give enhancedly flavorous soy sauce.

*Example 4.*—One gram of ibotenic acid, one gram of tricholomic acid and one gram of sodium 5'-insoinate are added to 10 kilograms of mashed fish meat and mixed thoroughly. The mixture is piled on a board, followed by steaming at 85° C. for 15 minutes to give Kamaboko (a kind of fish paste) of enhanced flavor.

*Example 5.*—To 100 grams of sodium 5'-inosinate is added 20 grams of ibotenic acid, followed by mixing thoroughly, whereupon powdery seasoning composition is obtained.

*Example 6.*—To a solution of 200 grams of sucrose monopalmitate in 2 liters of ethanol is added a mixture of 100 grams of ibotenic acid, 100 grams of tricholomic acid, 300 grams of sodium 5'-guanylate and 1400 grams of monosodium glutamate, followed by mixing for 10 minutes. Then the ethanol is filtered off to give powdery seasoning composition.

Having thus disclosed this invention, what is claimed is:

1. A composition comprising 5'-nucleotide in admixture with a member selected from the group consisting of tricholomic acid, ibotenic acid and a nontoxic alkaline salt of one of said acids, wherein the weight ratio of the 5'-nucleotide to the acid or salt is in the range of 100:1 to 1:100.

2. Monosodium glutamate in admixture with a composition according to claim 1, wherein the weight ratio of the glutamate to the composition is in the range of from 1:10 to 10:1.

3. A composition according to claim 1 wherein the weight ratio of the 5'-nucleotide to the acid or salt is in the range of 1:10 to 10:1.

4. A method of enhancing food flavor which comprises applying to the food an effective amount of a composition according to claim 1.

5. A method of enhancing the flavor of food which comprises applying to the food an effective amount of a composition according to claim 2.

6. A method of enhancing the flavor of food which comprises adding to the food an effective amount of a member selected from the group consisting of tricholomic acid, ibotenic acid and a nontoxic alkaline salt of one of said acids.

7. A method of enhancing the flavor of a condiment which comprises adding to the condiment an effective amount of a member selected from the group consisting of tricholomic acid, ibotenic acid and a nontoxic alkaline salt of one of said acids.

(References on following page)

References Cited

FOREIGN PATENTS 6,516,422   6/1966   Netherlands.

OTHER REFERENCES

Flavor Chemistry, Advances in Chemistry Series #56, Gould, ed., American Chemical Society, Washington, D.C. (April 1965), pp 270–274.

Chemical and Pharmaceutical Bulletin 13, No. 6, pp. 753–758. January–June 1965, (Japan).

MAURICE W. GREENSTEIN, Primary Examiner

H. H. KLARE III, Assistant Examiner

U.S. Cl. X.R.

99—98, 107, 111, 124, 144, 143, 145